United States Patent [19]

Lo

[11] Patent Number: 5,111,236
[45] Date of Patent: May 5, 1992

[54] MULTIPLE-PRINT 3-D PRINTER AND PROCESS

[76] Inventor: Allen K. W. Lo, 5022 Hidden Branches Dr., Dunwoody, Ga. 30338

[21] Appl. No.: 499,668

[22] Filed: Mar. 27, 1990

[51] Int. Cl.⁵ .......................................... G03B 27/32
[52] U.S. Cl. ..................................... 355/22; 355/33; 355/46; 352/58; 352/81
[58] Field of Search ................. 355/33, 34, 46, 22; 352/46, 53, 58, 81

[56] References Cited

U.S. PATENT DOCUMENTS

| | | | |
|---|---|---|---|
| 1,882,424 | 10/1932 | Ives | 355/22 |
| 2,515,862 | 8/1950 | Carlton et al. | 355/46 |
| 3,895,867 | 7/1975 | Lo et al. | 355/22 |
| 4,101,210 | 7/1978 | Lo et al. | |
| 4,120,562 | 10/1978 | Lo et al. | |
| 4,132,468 | 1/1979 | Lo et al. | |
| 4,468,115 | 8/1984 | Lao | 355/22 |
| 4,800,407 | 1/1989 | Lo | 355/22 |
| 4,852,972 | 8/1989 | Lo | |
| 4,903,069 | 2/1990 | Lam | 355/22 |

OTHER PUBLICATIONS

*Stereoscopy,* by N. A. Valyus, Focal Press, N.Y., 1966, pp. 195-205.
*Applied Optics and Optical Engineering,* Kingslake, vol. II, Academic Press, N.Y., 1965, pp. 108-117.
*Three-Dimensional Imaging Techniques,* Okoshi, Academic Press, N.Y., 1976, pp. 60-95.

*Primary Examiner*—Monroe H. Hayes
*Attorney, Agent, or Firm*—Harold L. Marquis

[57] ABSTRACT

A method for high-speed and simultaneous printing of a number of 3-D photographs by utilizing a printer with a wide field of coverage so that all of the 2-D views required to produce a 3-D photograph are projected simultaneously onto the number of 3-D photographs corresponding to the number of 2-D negatives utilized. All of the 3-D print materials advance to the next position for printing until all of the image bands are filled with a portion of the appropriate 2-D view. A high speed printer with a wide field of coverage capable of simultaneously projecting all of the 2-D views required to produce a 3-D picture onto a number of 3-D prints which may have a computer or microprocessor controlling the exposure and moving the 3-D print material between exposures.

12 Claims, 4 Drawing Sheets

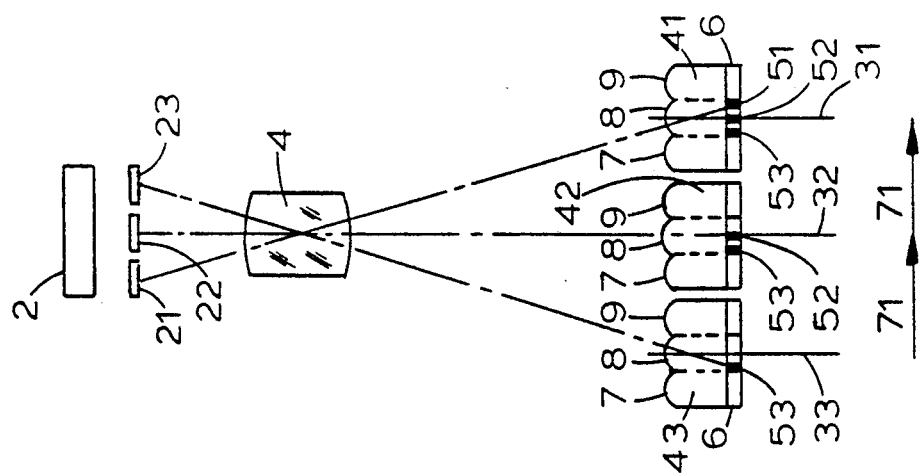
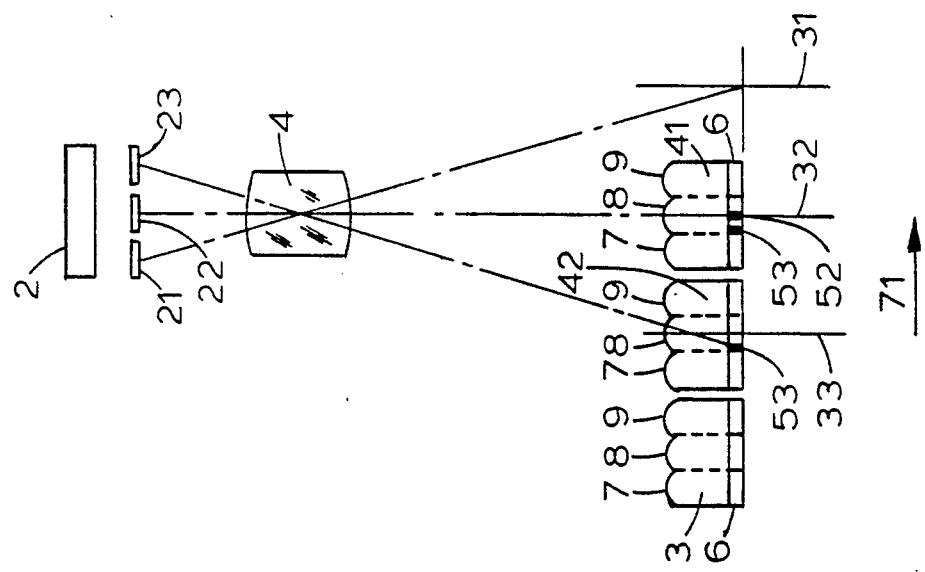
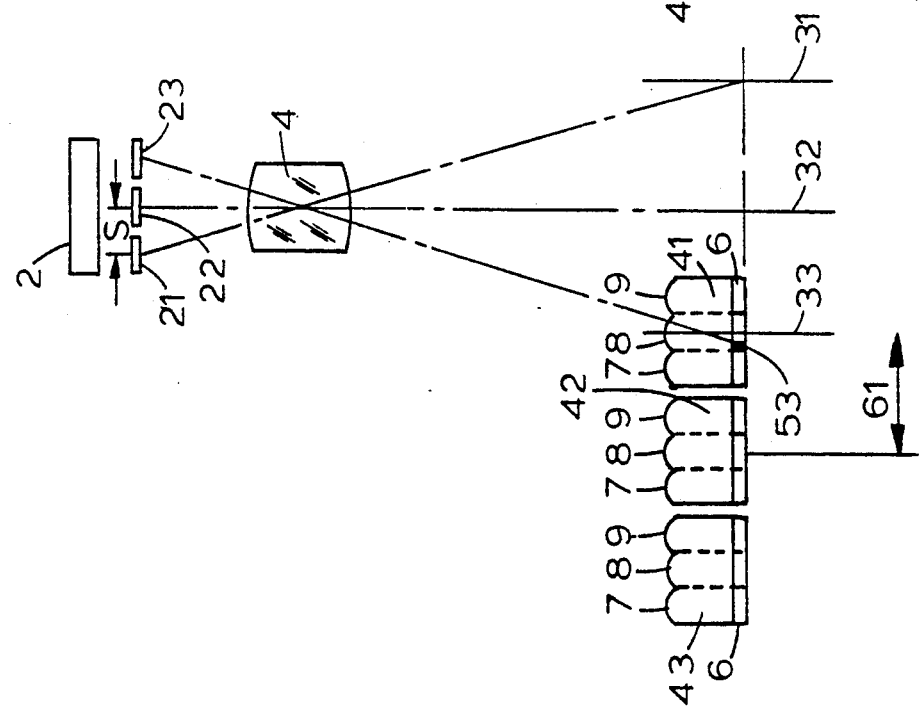

MULTIPLE-PRINT 3-D PRINTER AND PROCESS

PRIOR ART

Lenticular screen type 3-D pictures are produced by composing a sequence of two-dimensional views of an object from different vantage points onto a lenticular print film.

The two-dimensional views are projected either sequentially or simultaneously through a lenticular screen exposing the photographic emulsion coating at the focal plane of the lenticules.

N. A. Valyus in "Stereoscopy" (Focal Press, 1966) at pages 199–203 discloses printing right and left images simultaneously onto the film. Only one condensed image from each two-dimensional view is printed. This method would require a large number of two-dimensional views to produce enough condensed images to fill up the spaces under the lenticules. This large number of condensed images is not commercially practical leaving a number of unexposed strips under each lenticule which results in an inferior three-dimensional photograph. Valyus contributed to the three-dimensional art by showing the method and reason for controlling the displacement of foreground and background images.

Dudley "Applied Optics & Optical Engineering" (Rudolf Kingslake, Ed., 1965) discloses at pages 114–116 the movement of the lenticular screen and the intermittent exposure of each of the eight images recorded on the film.

Okoshi in "Three-Dimensional Imaging Techniques" (1976) on pages 71–88 discloses the use of several projectors to project the images onto the emulsion. Okoshi analyzes in detail the theory of optimum projector separation and printing images on the photographic emulsion. Okoshi also analyzes the spread of the image on the emulsion and points out that excessive spread degrades the resultant directivity of the picture.

Lo and Nims in U.S. Pat. No. 3,895,867 (Jul. 22, 1975) Col. 8 disclose a technique for recording images on all of the film areas underlying the lenticules. This was achieved by repeatedly turning off the light on the projector and intermittently shifting the screen or film. The disadvantage of this method of intermittently spreading the condensed images is the time required to make each of the incremental changes of the angle of projection. The sequence of rapid stopping and restarting of the negative, enlarging lens and the print film during composing creates shocks and generates vibrations that cause overlapping of the condensed images and decreases the sharpness of the resulting three-dimensional image. This patent also shows a technique of continuously spreading the condensed image by leaving the projection light on during the movement of the projector. This causes the condensed image to continuously overlap across the entire width of the lenticule. The disadvantage of this scanning technique is that the image overlapping reduces image sharpness and contrast and degrades the resulting three-dimensional image.

The following patents also disclose early composing techniques for three-dimensional pictures:

Japanese Patent No. 42-5473 issued Mar. 6, 1967
Japanese Patent No. 49-607 issued Jan. 9, 1974

Lo and Nims in U.S. Pat. No. 4,120,562 (Oct. 17, 1978) disclose a method of scanning the projected image to fill the lenticule with images. The composing apparatus disclosed in this patent is also structured for changing the angle of projection by a predetermined amount during the scanning operation.

Lao in U.S. Pat. No. 4,468,115 (Aug. 28, 1984) discloses a projector in which the lamp housing moves continuously to prevent jerking due to rapid stops and starts. Its continuous scanning results in considerable overlapping of images which reduces the sharpness of the picture.

The intermittent projection disclosed in the prior art suffers from the disadvantage that a large number of projections must be made in order to fill the area behind the lenticule with images which makes this system commercially impractical.

The off alignment of the multiple image elements in the intermittent method decreases the sharpness of the image picture. However, the continuous scanning method does fill the entire area behind each lenticule with images, but the overlapping of the images reduces the clarity of the picture.

U.S. Pat. No. 4,852,972 (Lo) discloses an improved method of printing three-dimensional images which involves using a greater intensity of light when exposing the image bands near the edges of the lenticule and those near the center. This results in obtaining image bands of substantially equal density across the width of the lenticule. The method of this patent can be used to produce a single image element in each image band area. However, the quality of the three-dimensional pictures produced by this method is enhanced by reproducing two-dimensional views into a multiple number of discreet condensed images which are printed edge to edge under the lenticules of the lenticular print film with minimal overlapping or without being interrupted by unexposed strips between the discreet condensed images. The method of this patent results in equalizing the density of images across the field of the lenticule resulting in improved picture quality.

This patent also discloses the use of a metallic iris with a multiple number of different size apertures to vary the intensity of the light as desired.

U.S. Pat. No. 4,101,210 (Lo et al) discloses a method of avoiding the gaps between adjacent, condensed images in an image band by using a plurality of projection lenses along a plurality of rows parallel to the lenticular screen. This patent also shows arranging the negatives in parallel rows in the projection process. The use of a large number of projection lenses arranged in rows and the large number of negatives used in this process makes it cumbersome. This multi-lens projection system is also disclosed in U.S. Pat. No. 4,132,468 (Lo et al).

In order to print a 3-D photograph under the prior art, each one of the 2-D views must be sequentially exposed one by one onto the print material. Between each exposure two of the three components in the printing system (i.e., the 2-D negatives, the enlarging lens, the print material) must be repositioned to align the printed image exposing each of the 2-D views. For example if the 3-D print is composed of five 2-D views, then the components in the printing system must be repositioned five times and five single exposures must be made to complete the printing of a single 3-D print. This process is very time consuming and has made the mass production of 3-D print not very feasible.

It is known in the prior art that 3-D photographs can be printed by using a multi-lens printer. However, it is time consuming and difficult. The enlarging lenses on a multi-lens printer must be matched in order to insure that the dimensions, color and exposure value between 2-D images which constitute a stereo pair are identical. If they are not identical, the image quality of the 3-D photograph is degraded.

SUMMARY OF THE INVENTION

A new type of 3-D printer has been developed to produce 3-D pictures rapidly by simultaneously projecting all of the 2-D view images into a multiple number of 3-D prints. The 3-D printer has a wide field of coverage so that all of the 2-D views can be projected simultaneously onto the print materials.

The 2-D negatives and the enlarging lens are kept stationary at all times which minimizes the possibility of vibration and off alignment of the 2-D images resulting in improved sharpness of the 3-D picture. Only a single enlarging lens is used in this printer to avoid mismatching of image size and color balance which is a problem when using a multi-lens printer.

A new composing method has been developed to print a multiple number of 3-D prints simultaneously. This is achieved by using a 3-D printer lens with a wide field of coverage in printing a single discrete image element of a 2-D view in each of the lineoform image bands.

BRIEF DESCRIPTION OF THE DRAWINGS

FIG. 3 is a diagrammatic view of the 3-D printer of FIG. 2 showing the sequence of exposure of print materials in printing a multiple number of 3-D photographs simultaneously.

DETAILED DESCRIPTION OF THE DRAWINGS

Figure 1:
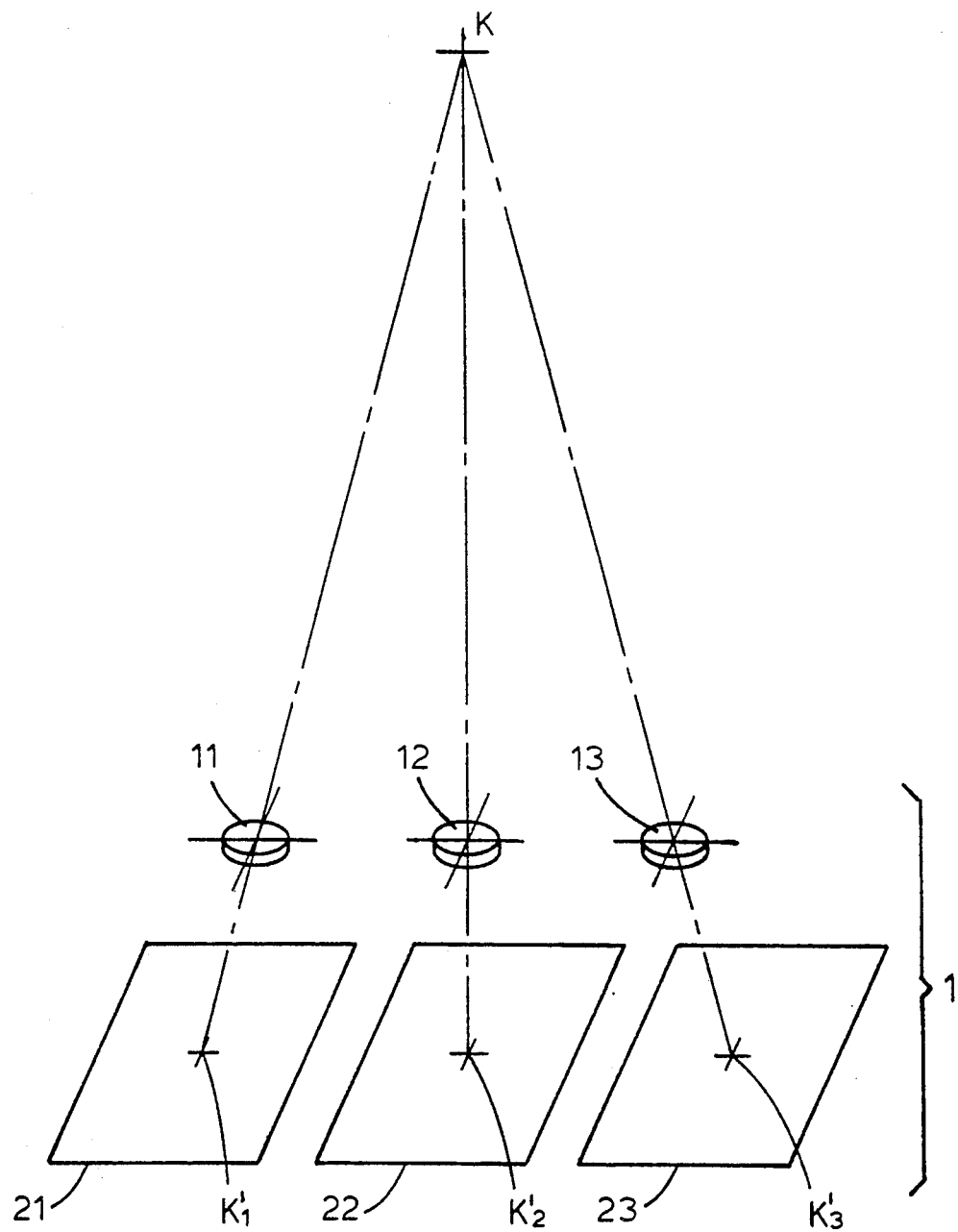
FIG. 1 is a diagrammatic view of a multi-lens 3-D camera taking a photograph of an object.

FIG. 1 is a diagrammatic view of a 3-D camera photographing an object. The camera 1 has three lenses 11, 12 and 13 which are focused on object K. When the picture is taken by the camera, photographic film is exposed in three different 2-D views 21, 22 and 23. The object K is exposed in each of these 3-D views ($K'_1$, $K'_2$ and $K'_3$).

Figure 2:
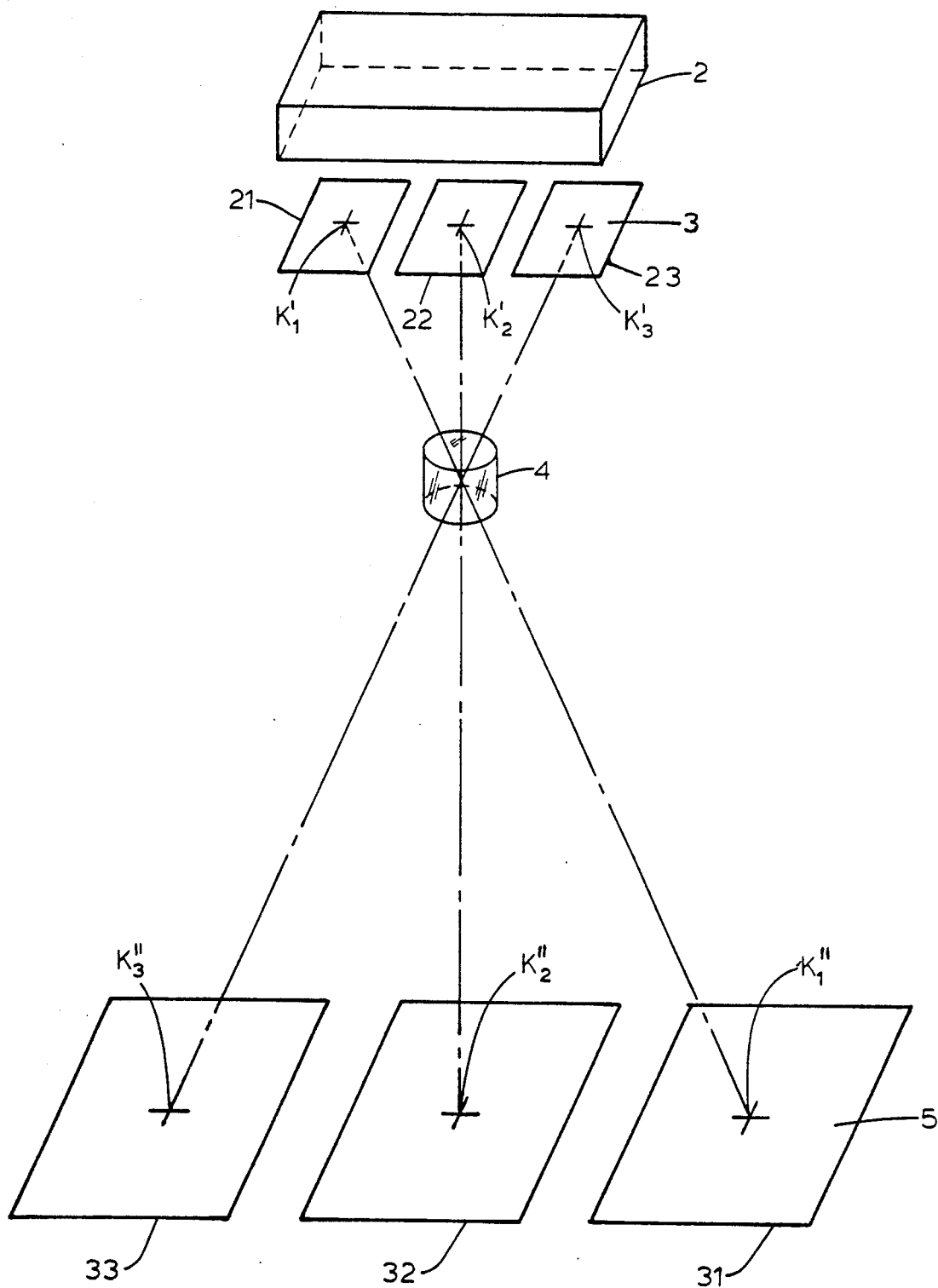
FIG. 2 is a diagrammatic view of a printer printing 3-D photographs.

FIG. 2 is a diagrammatic view showing the printing system of this invention. The printer has a lamphouse 2 with a negative carrier (not shown) for holding the three negative views 21, 22 and 23. The negatives are positioned at negative plane 3. The enlarging lens 4 projects the three 2-D views 21, 22 and 23, onto print materials 31, 32 and 33 at image plane 5. Three different views of the object K on negative views $K'_1$, $K'_2$ and $K'_3$ are projected onto the print material at $K''_1$, $K''_2$ and $K''_3$ respectively. The enlarging lens 4 must have a wide field of coverage in order to project all three images simultaneously.

FIG. 3 is a diagrammatic view illustrating the sequence of exposure of the print materials in printing a multiple number of 3-D prints simultaneously. The negative views 21, 22 and 23 and projection lens 4 remain stationary throughout the sequence. Only the print materials 41, 42 and 43 are moved between exposures. In the first exposure illustrated by A, print material 41 is positioned at projection image location 33. The lamp is turned on to make the first exposure of 2-D view 23 onto the first print material 41 to expose the emulsion layer 6 resulting in forming an image in band 53 in all the lenticules in print material 41. All of the lenticules of the print materials are exposed at the same time to view 23, but only lenticules 8 are shown being exposed in FIG. 3. The lamp is then turned off, and the first print material 41 advances in direction 71 a predetermined distance 61 to projection image location 32. The second print material 42 is advanced to projection image location 33 in preparation for an exposure at B. The lamp is turned on to expose 2-D view 23 on to print material 42 to form an image in image band 53 in all of the lenticules in print material 42 and to simultaneously expose 2-D view 22 onto print material 41 to form an image in image band 52 immediately adjacent to image band 53 in all of the lenticules of the print material 41. The lamp is then turned off as the exposure is completed. An exposure is made at C after print material 41 is advanced in direction 71 to projection image location 31, and the second print material 42 is advanced to projection image location 32, and the third print material 43 is advanced to projection image location 33 for an exposure. The lamp is turned on simultaneously exposing all three 2-D views 21, 22 and 23 onto print materials 41, 42 and 43. The 2-D view 23 will fill image band 53 on print material 43 in all lenticules. The 2-D view 22 will fill image band 52 adjacent to image band 53 on print material 42. The 2-D view 21 will fill image band 51 next to image band 52 on print material 41 in all lenticules. This results in filling all of the image bands in all of the lenticules, completing the printing of print material 41. Print material 41 is removed from the printer, and print materials 42 and 43 are advanced in direction 71 to the next position at which time the printing of print material 42 is completed. Print material 43 will then be advanced to final position 31 to complete the printing of that photograph. It should be realized that additional printing material can follow behind print material 43 until the desired number of photographs of 2-D views 21, 22 and 23 have been printed.

While only three image bands in a photograph are illustrated, it should be realized that this same process can be used when four or more 2-D views are used to compose a 3-D print.

The distance 61 for which the print material must be advanced after each exposure is based upon distance (s) between the key subject images of adjacent 2-D views and the enlargement ratio between the size of the 2-D view and the size of the 3-D print.

The printer of this invention has a wide field of coverage so that it can simultaneously project all of the 2-D views that are required to produce a 3-D picture onto the same number of 3-D prints that correspond to the number of 2-D negatives used. Thus in the case where there are three 2-D views, three 3-D prints can be printed simultaneously. Correspondingly in the case where there are four 2-D views, four 3-D prints can be printed simultaneously. It will be recognized that in commencing the printing, only a single image band will be filled on the first print material on the first exposure. On the second exposure, the first and second print material are advanced so that a second image band will be filled on the first print material, and an image band will be filled on the second print material on the exposure. Thereafter in the case of printing three 2-D views, three 3-D print materials will be filled simultaneously. When the last of the print materials has its first image band filled, additional exposures of that print will be needed in order to fill the other image bands. In the case of three 3-D negative views, two additional exposures will be necessary to fill the necessary image bands.

A computer or microprocessor can be utilized in the printer in order to speed the printing process. A computer or microprocessor can be programmed to precisely control a motor that moves a printing easel containing the printing materials into proper position for printing. In addition the computer or microprocessor can be programmed so that the lamp is turned on for the precise duration of exposure desired. The computer or microprocessor will speed the printing process while a large number of photographs are being printed. It can move the printing materials into proper printing position very quickly and precisely turn the lamp on for the exposure immediately after the print materials are in proper printing position.

Figure 4:
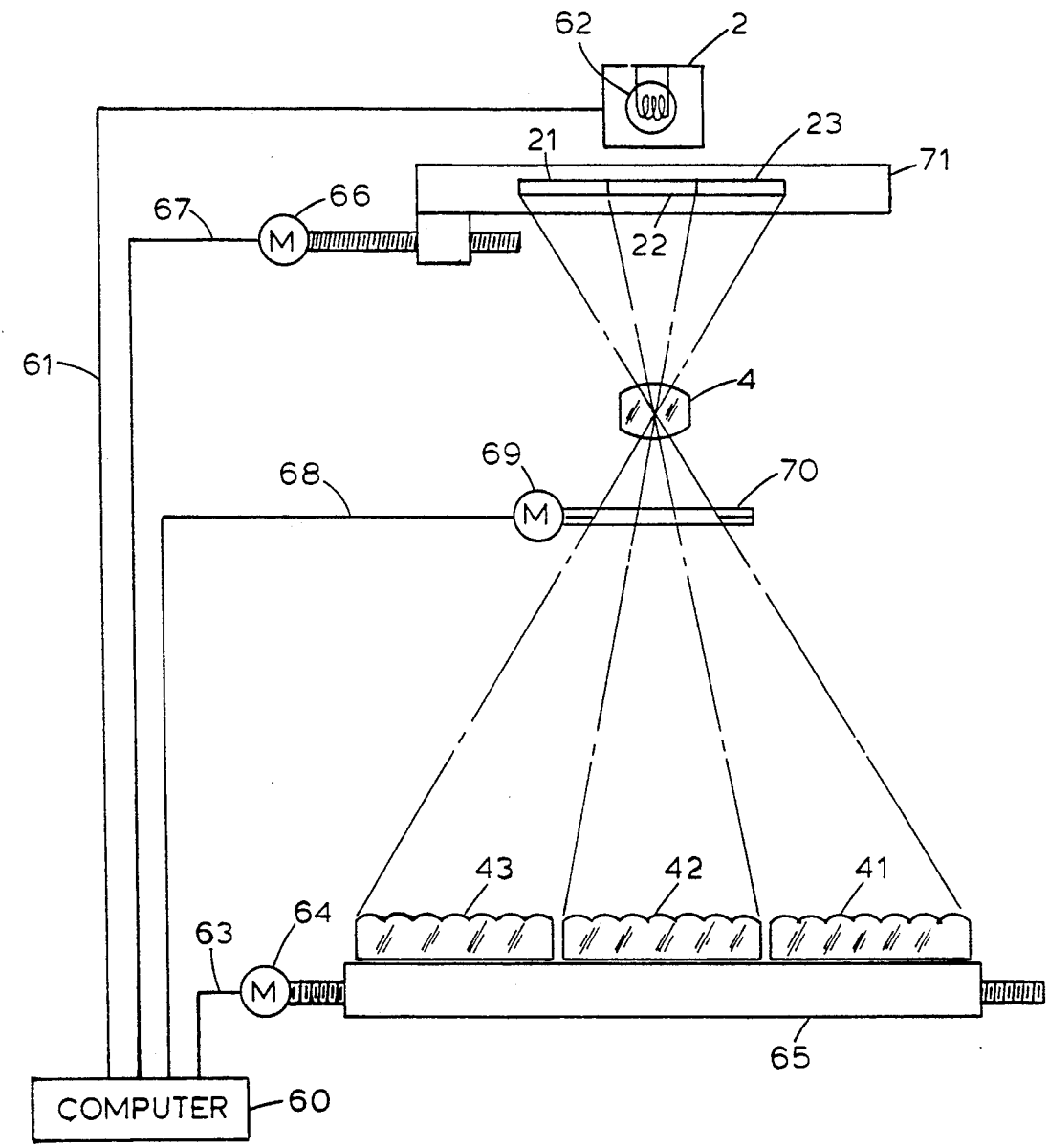
FIG. 4 is a diagrammatic view of the 3-D printer showing a computer or microprocessor controlling the movement of the printing easel and the exposure of the printing material.

FIG. 4 is a diagrammatic view of the printer of this invention illustrating a computer for controlling movement of the printing easel and the duration of exposure of the printed material during the printing process. The computer 60 is connected by lead 61 to the lamp 62 in the lamphouse 2 to control the duration of exposure of print material 41, 42 and 43. The computer is also connected by lead 63 to motor 64 which moves the printing easel 65 on which the print material 41, 42 and 43 has been placed. The computer is also connected to motor 66 by lead 67 to control the movement of the negative carrier 71 containing the negatives 21, 22 and 23. In addition, the computer is connected by lead 68 to motor 69 controlling the shutter 70 to control the duration of exposure.

The computer can be programmed to move the print material 41, 42 and 43 quickly into proper position for printing and to have the desired duration of exposure to obtain prints of high quality.

The printer with the wide field of coverage of this invention and the method for utilizing this printer enables a large number of 3-D prints to be printed simultaneously and greatly speeds the printing process. By keeping the lamp and lens stationary, the resolution of the views is enhanced as only the print material is moved between each exposure. In the prior art it is necessary to move two of three of the following elements: the lamp, the lens, or the print material. By only moving the print material in this invention, the printing system is less complicated and more accurate.

I claim:

1. A high speed three dimensional (3-D) printer for simultaneously projecting all of the 2-D negative views required to produce a 3-D photograph onto the number of 3-D prints corresponding to the number of 2-D negative views used in the process, said printer comprising:
   means for holding a negative, light projecting means, and a lens with a field of coverage wide enough to simultaneously print all of the 2-D views required to produce a 3-D print onto the number of 3-D prints corresponding to the number of 2-D negative views used in the process;
   means for holding the number of 3-D prints it is desired to print;
   means for moving the 3-D prints between exposures to fill all the image bands in the 3-D prints.

2. The printer of claim 1 in which the means for holding the number of 3-D prints is a printing easel.

3. The printer of claim 2 in which the means for moving the 3-D prints is an electric motor that moves the printing easel.

4. The printer of claim 1 in which a computer is programmed to control the means for moving the 3-D prints to the appropriate position between exposures and to control the light projecting means so that the duration of exposure of the 3-D prints is for the desired duration.

5. The printer of claim 3 in which a computer is programmed to control the motor moving the printing easel to the appropriate position between exposures and programmed to control the light projecting means so that the duration of exposure of the 3-D prints is for the desired duration.

6. The printer of claim 5 in which the light projecting means is a lamp contained in a lamphouse.

7. A high speed method for simultaneously printing all of the 2-D negative views required to produce a 3-D print onto the number of 3-D prints corresponding to the number of 2-D views to compose a 3-D print utilizing a printer having means for holding a negative wherein said printer has means for holding a negative, light projecting means and a lens with a field of coverage wide enough to simultaneously print all of the 2-D views required to produce a 3-D print onto the number of 3-D prints corresponding to the number of 2-D negative views used in the process; and means for holding the number of 3-D prints desired and means for moving the 3-D prints between exposures to fill all the image bands in all of the 3-D prints; said method comprising placing the number of 3-D prints it is desired to print on the means for holding the prints and printing an image band on a first 3-D print, then moving the 3-D prints and printing a second image band on the first 3-D print and simultaneously printing an image band on a second 3-D print and then moving the 3-D prints and simultaneously printing an image band on the first 3-D print and a different image band on the second 3-D print and a different image band on a third 3-D print and continuing this method until the desired number of 3-D prints have been printed.

8. The method of claim 7 in which the means for holding the number of 3-D prints is a printing easel.

9. The method of claim 8 in which the means for moving the 3-D prints is a motor which moves the printing easel.

10. The method of claim 7 in which a computer is programmed to control the movement of the 3-D prints to the appropriate position between exposures and to control the light projecting means so that the exposures of the 3-D prints is for the desired duration.

11. The method of claim 9 in which a computer is programmed to control the electric motor for moving the printing easel to the appropriate position for printing the 3-D prints and programmed to control the light projecting means so that the exposures of the 3-D prints is for the desired duration.

12. A high speed method for simultaneously printing all of the 2-D negative views required to produce a 3-D print onto the number of 3-D prints corresponding to the number of 2-D views to compose a 3-D print utilizing a printer having means for holding the prints said method comprising printing an image band at one edge of each lenticule on a first 3-D print, then moving the 3-D prints and printing a second image band adjacent the image band first printed on the first 3-D print and simultaneously printing an image band at one edge of each lenticule on a second 3-D print and then moving the 3-D prints and simultaneously printing a third image band adjacent the image band second printed on the first 3-D print and simultaneously printing second image band adjacent the first image band in the second print and first image band at one edge of each lenticule in the first print and continuing this method until the desired number of prints have been printed.

* * * * *